235-379 SR
3/18/83 OR 4,369,360

United States Patent [19]

Tsuji

[11] 4,369,360

[45] Jan. 18, 1983

[54] BANK NOTE DEPOSITING APPARATUS

[75] Inventor: Keiji Tsuji, Tokyo, Japan

[73] Assignee: Laurel Bank Machine Co., Ltd., Tokyo, Japan

[21] Appl. No.: 252,782

[22] Filed: Apr. 10, 1981

[30] Foreign Application Priority Data

Apr. 15, 1980 [JP] Japan .................................. 55-49946

[51] Int. Cl.[3] .......................... G06F 15/30; G07F 7/08

[52] U.S. Cl. ...................................... 235/379; 235/381

[58] Field of Search ................. 209/534; 235/379, 381

[56] References Cited

U.S. PATENT DOCUMENTS 4,236,639 12/1980 Boettge .............................. 209/534

*Primary Examiner*—Harold I. Pitts

*Attorney, Agent, or Firm*—Fleit & Jacobson

[57] ABSTRACT

A number of bank notes are inserted into the bank note entrance unit of a bank note depositing apparatus and are continuously received so that they may be inspected and counted at a high speed. After the counting operation, the bank notes are stored in a temporary storage unit and subsequently in such one of the plural storage portions of a movable safe as is positioned to receive the bank notes from the temporary storage unit. Another standby vacant storage portion of the movable safe is then automatically brought to the same position to receive the bank notes when a predetermined number of the bank notes are stored in the first storage portion.

3 Claims, 4 Drawing Figures

BANK NOTE DEPOSITING APPARATUS

BACKGROUND OF THE INVENTION

1. Field of the Invention

The present invention relates to a bank note depositing apparatus which can inspect and count a number of bank notes in an automatic manner.

2. Description of the Prior Art

In recent years, a variety of bank note depositing apparatus have been developed and employed to process bank notes at a bank.

SUMMARY OF THE INVENTION

The present invention has been conceived in view of the background thus far described and has an object to provide a bank note depositing apparatus of the type, in which a number of bank notes inserted into a bank note entrance unit and continuously received so that they may be inspected and counted at a high speed, in which the bank notes having been counted are stored in a temporary storage unit, in which the bank notes are stored, after they have been inspected and counted, in such one of the plural storage portions of a movable safe as is positioned at that time to receive the bank notes from the temporary storage unit, and in which another standby vacant storage portion is automatically brought to the position to receive the bank notes when a predetermined number of the bank notes are stored in the first-mentioned storage portion.

BRIEF DESCRIPTION OF THE DRAWINGS

Other objects and advantages of the present invention will become apparent from the following description taken in conjunction with the accompanying drawings, in which.

DESCRIPTION OF THE PREFERRED EMBODIMENT

Figure 1:
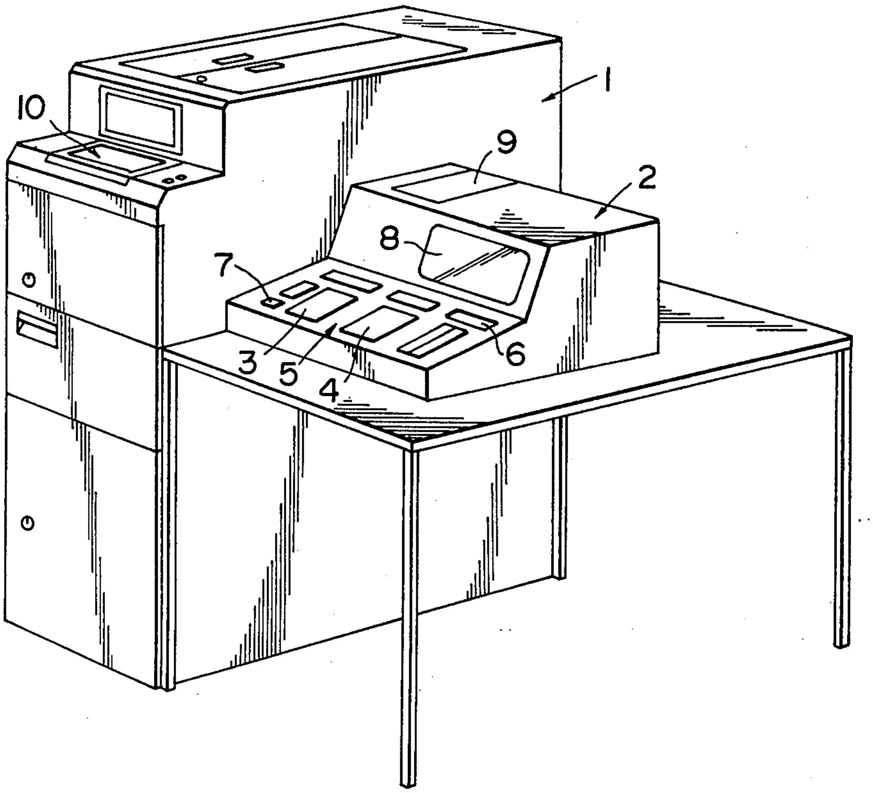
FIG. 1 is a perspective view showing the overall construction of a bank note depositing apparatus according to one embodiment of the present invention.
Figure 2:
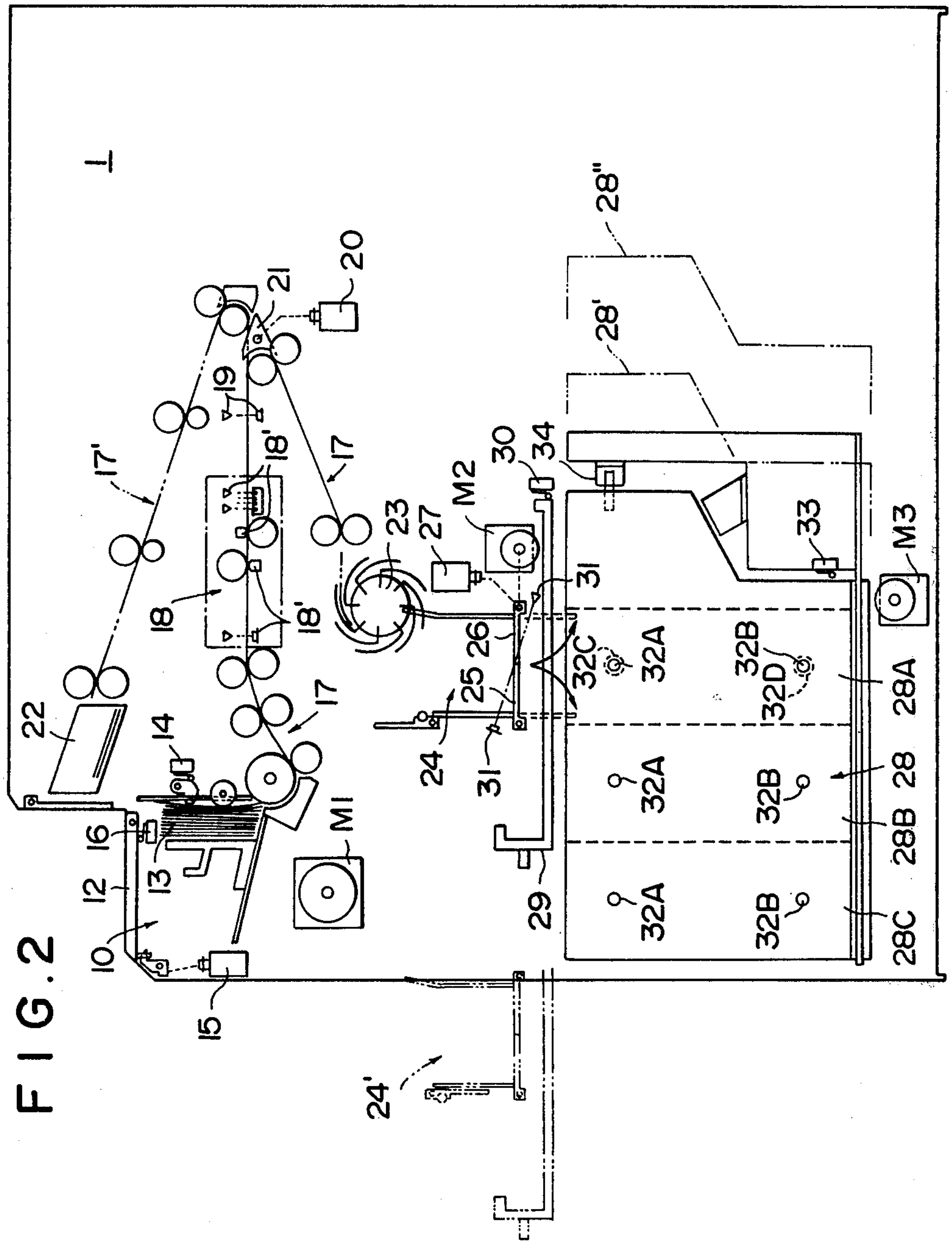
FIG. 2 is a side view showing the internal construction of the body of the bank note depositing apparatus of FIG. 1.

The present invention will now be described in connection with one embodiment thereof with reference to the accompanying drawings. In FIGS. 1 and 2 showing the mechanical construction of a bank note depositing apparatus, reference numerals 1 and 2 indicate the body of a bank note depositing apparatus and an operation table, respectively. Although the detail of the body 1 is shown in FIG. 2, the operation table 2 is equipped with an arithmetic circuit or the like for feeding a variety of commands to that body 1, for calculating the sum of the bank notes, which have been inspected to be genuine by the bank note inspecting unit in the body, in respect of each kind, and for totaling the sums. For these operations, the operation table 2 is equipped with: a key board 5 which in turn is equipped with numeral keys 3 and various function keys 4; a card slit 6 through which a card written and recorded with the intrinsic number of an operator is inserted so that it may be read in a card reader (although not shown) thereby to start the processing operations of the body 1; and a confirmation button 7, a display unit 8 and a printer 9, all of which will be described later. Thus, the body 1 and the operation table 2 are electrically connected with each other through a cable (although not shown) so that they can transfer their signals inbetween.

Figure 3:
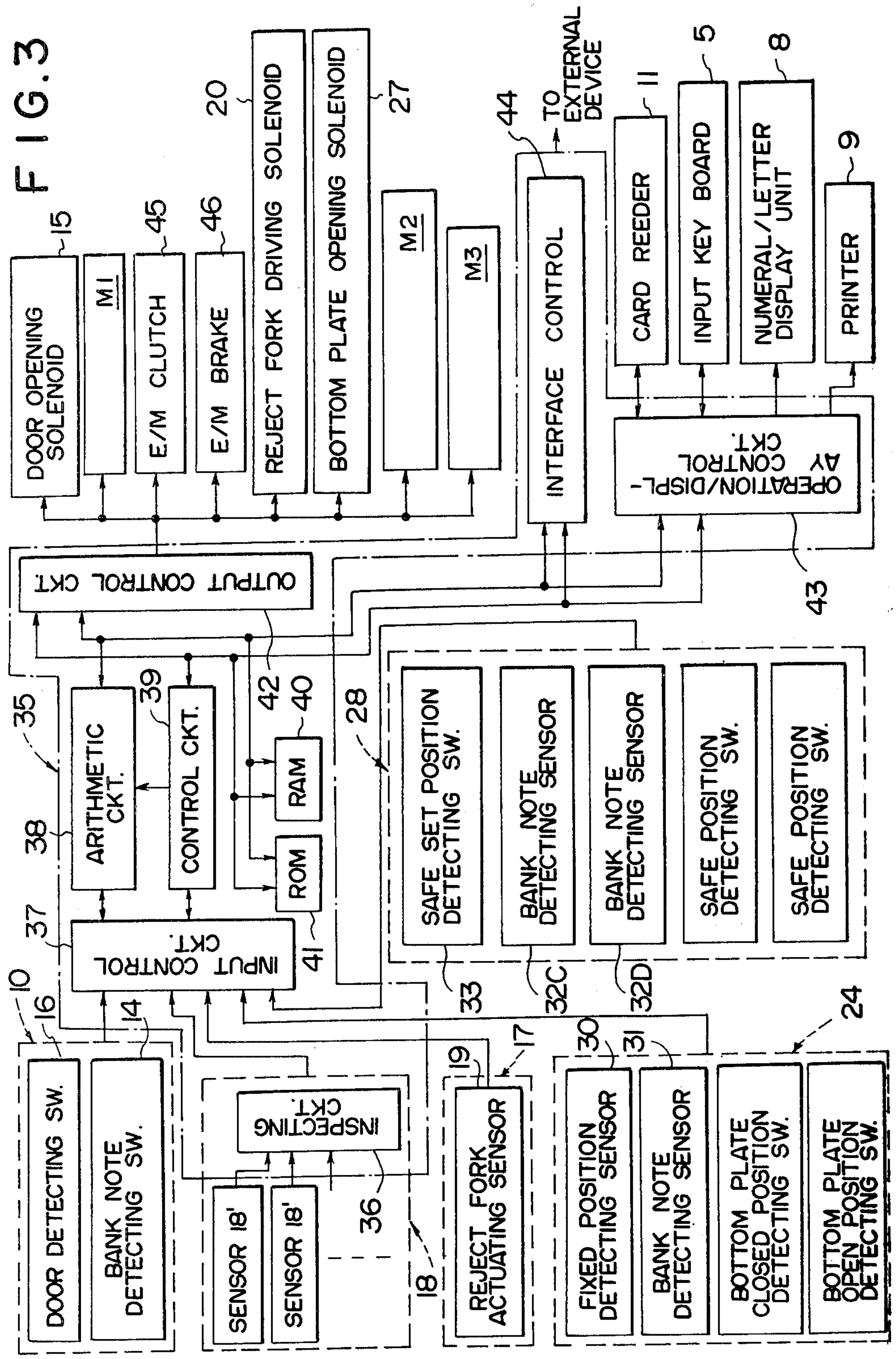
FIG. 3 is a block diagram showing the overall construction including an electronic circuit.

The construction of the body 1 will be described in more detail in the following. A bank note entrance unit 10 is constructed such that the aforementioned card is read by a card reader 11 (which is shown in FIG. 3) when the operator inserts that card into the card slit 6 thereby to start the processing operations of the bank notes and such that its door 12 is automatically opened if the read result reveals that the card is genuine. At this time, the operator inserts four hundred sheets of bank notes 13, for example, at the maximum into the bank note entrance unit 10. In this instance, the bank notes 13 to be inserted may include all of the four current types (i.e., ¥ 10,000, ¥ 5,000, ¥ 1,000 and ¥ 500). Moreover, the bank notes 13 inserted are detected by a bank note detecting switch 14. Thus, if the bank notes 13 are correctly inserted so that the door 12 is closed, the inspecting and counting processes are started. Incidentally, numeral 15 appearing in FIG. 2 indicates a door opening solenoid. Moreover, numeral 16 indicates a door detecting switch for detecting the opened or closed condition of the door 12.

The bank notes thus correctly inserted into and set in the bank note entrance unit 10 are then frictionally transferred one by one to a bank note conveyor system 17, which is driven by the rotations of a conveyor motor M1, so that they are conveyed to a bank note inspecting unit 18, in which a variety of inspections including the kind, genuineness and overlap of the bank notes are performed. Incidentally, the inspection of the bank notes is effected, as is well known in the art, by a variety of detections including those of the size, length and pattern, and that of the magnetisim containing the printing ink of the bank notes. Moreover, the bank notes, which have been judged in respect of their kinds and genuineness by the bank note inspecting unit 18, are further conveyed until they are detected by means of a reject fork actuating sensor 19. This sensor 19 is composed of a pair of light emitting and receiving elements (such as phototransistors). As a result, when the bank note, which has been judged to be counterfeit by the bank note inspecting unit 18, is detected by that sensor 19, this sensor 19 energizes a reject fork driving solenoid 20 with its detected signal so that a reject fork 21 is accordingly driven by the reject fork driving solenoid 20 thereby to interchange the bank note conveying passage to a conveying passage 17' at the side of a reject box 22, whereby the counterfiet bank note can be rejected into the reject box 22. Incidentally, this reject box 22 is adapted to be stored with not only the counterfeit bank nore but also the bank note which has been conveyed in an overlapped manner and/or the bank note which has failed to be inspected.

In the case or the genuine or correct bank note, on the contrary, the detected signal of the sensor 19 is rendered ineffective to leave the reject fork driving solenoid 20 inoperative so that the bank notes in this case is taken in an accumulating wheel 23 until they are stored in a temporary storage unit 24. Incidentally, the reject fork 21 holds its operative position after it has rejected the counterfeit bank note or the like to the reject box 22 and before the succeeding bank note is judged to be genuine by the detected signal of the sensor 19.

The temporary storage unit 24 is formed into such a box shape as has its upper side (i.e., the side facing the accumulating wheel 23) opened and as has its bottom divided at its center into two bottom plates 25 and 26. As shown, these bottom plates 25 and 26 have their outer sides hinged to the side plates of the temporary storage unit 24 so that they can be swung about a right angle. Moreover, the bottom plates 25 and 26 thus hinged are normally closed so that the bank notes 13 having been inspected and counted can be stored in the temporary storage unit 24. However, when the aforementioned confirmation button 7 is depressed after all the bank notes 13 inserted into the bank note entrance unit 10 have been inspected and counted and after the totaled sum displayed in the display unit 8 has been visually confirmed, a solenoid 27 is energized to rotate the bottom plates 25 and 26 about a right angle downward in the clockwise and counter-clockwise directions, respectively, so that the bank notes 13 which have been temporarily stored are allowed to drop and stored in a safe 28 disposed therebelow. When a predetermined time elapses after the bottom plates 25 and 26 have been opened, motor M2 is energized to rotate so that the bottom plates 25 and 26 are rotated about a right angle clockwise and counter-clockwise, respectively, until they are closed. Incidentally, the box of the temporary storage unit 24 is placed on a drawable plate 29 which is made movable to the right and left of FIG. 2. Thus, when the bank notes 13 temporarily stored are to be checked again, the drawable plate 29 is actuated and drawn to carry the temporary storage box 24 out of the body 1 to a position, as indicated in phantom lines 24′ in FIG. 2, so that the bank notes 13 in the temporary storage unit 24 can be taken out. On the other hand, reference numeral 30 appearing in FIG. 2 indicates a fixed position detecting switch for detecting whether or not the drawable plate 29 is returned to a fixed position. Unless that switch 30 is operating, the processing operations of the bank notes by the body 1 cannot be carried out. Moreover, numeral 31 indicates a bank note detecting sensor which is made operative to detect whether any bank note is left in the temporary storage unit 24 or not thereby to control the operation of the body 1. That bank note detecting sensor 31 is composed of a pair of light emitting and receiving elements (such as phototransistors), which are disposed above and below the bottom plates 25 and 26, respectively. Moreover, these bottom plates 25 and 26 are partially formed with apertures so that the light emitted from the light emitting element may be received by the light receiving element. Although not shown, moreover, there are provided a pair of switches for detecting the open and closed positions of the bottom plates 25 and 26, respectively, so that the solenoid 27 and the motor M2 are fed with their command signals in response to the output signals of the respective switches.

The safe 28 is composed of three storage portions 28A, 28B and 28C. The bank notes 13 are first stored in the storage portion 28A. Whether a predetermined number of the bank notes 13 have already been stored in that storage portion 28A, is detected by two kinds of bank note detecting sensors 32C and 32D through inspection apertures 32A and 32B, which are formed at upper and lower portions of the storage portion 28A, respectively. When a storage of the predetermined number of bank notes is detected, the safe 28 is moved rightwardly of FIG. 2 by the action of a safe moving motor M3 so that another standby vacant storage portion 28B is brought to and set at a position below the bottom plates 25 and 26 of the temporary storage unit 24, as shown in phantom lines 28′ in FIG. 2. This second storage portion 28B is also formed with the inspection apertures 32A and 32B so that the stored state can be likewise detected by the bank note detecting sensors 32C and 32D. Thus, when a predetermined number of the bank notes 13 are also stored in the storage portion 28B, the safe 28 is also moved to the right so that another storage portion 28C is brought to and set at the position below the bottom plates 25 and 26 of the temporary storage unit 24, as shown in phantom lines 28″ in FIG. 2. Still moreover, the third storage portion 28C is also formed with the inspection apertures 32A and 32B for the bank note detecting sensors 32C and 32D so that, when a predetermined number of the bank notes 13 are stored in the storage portion 28C, the operator is informed of the fact that all the storage portions 28A to 28C of the safe 28 are occupied by the bank notes 13. At this instant, the operator draws the safe 28 out of the body 1 (to the left of FIG. 2) similarly to the temporary storage unit 24 and replaces it by another safe. Incidentally, the safe 28 is further equipped with both a safe set position detecting sensor 33 for detecting whether the safe 28 is correctly set or not and a safe locking unit 34, as shown, and with two switches, although not shown, for detecting the three set positions of the movable safe 28 so that it becomes possible in accordance with the output state of the signals of those two switches to judge which of the storage portions 28A to 28C of the safe 28 is set with respect to the temporary storage unit 24.

FIG. 3 shows the overall construction of the bank note depositing apparatus having the construction thus far described according to the embodiment while including even the circuit construction of an electronic circuit 35 mounted in the operation table 2. Here, the respective circuits in the electronic circuit 35 are cursorily described. An inspecting circuit 36 is made receptive of the output signals of the respective sensors 18′ of the bank note inspecting unit 18 thereby to inspect the genuineness, the kinds and overlap of the bank notes so that its output is fed through an input control circuit 37 to an arithmetic circuit 38 and a control circuit 39. In this instance, more specifically, the arithmetic circuit 38 accomplishes the summing, sum totaling and bank note number counting operations under the control of the control circuit 39 in accordance with the kind discriminated by the inspecting circuit 36 so that the arithmetic results are fed to and stored in an RAM (which is the abbreviation of "Random Access Memory") 40.

On the other hand, the control circuit 39 controls the overall operations of the bank note depositing apparatus in accordance with the micro-program which is stored in an ROM (which is the abbreviation of "Read Only Memory"). An output control circuit 42 controls the aforementioned solenoids 15, 20 and 27 and motors M1 to M3 under the control of the control circuit 39 and makes them to perform their predetermined respective operations. Incidentally, an electromagnetic clutch 45 and an electromagnetic brake 46 appearing in FIG. 3 are provided for the motor M1, respectively.

An operation/display control circuit 43 controls the respective operations of the card reader 11, key board 5, display unit 8 and printer 9, which are mounted in the operation table 2, under the control of the control circuit 39. Moreover, an interface control circuit 44 is a circuit which is used when another external device is connected with the bank note depositing apparatus according to the present invention.

Figure 4:
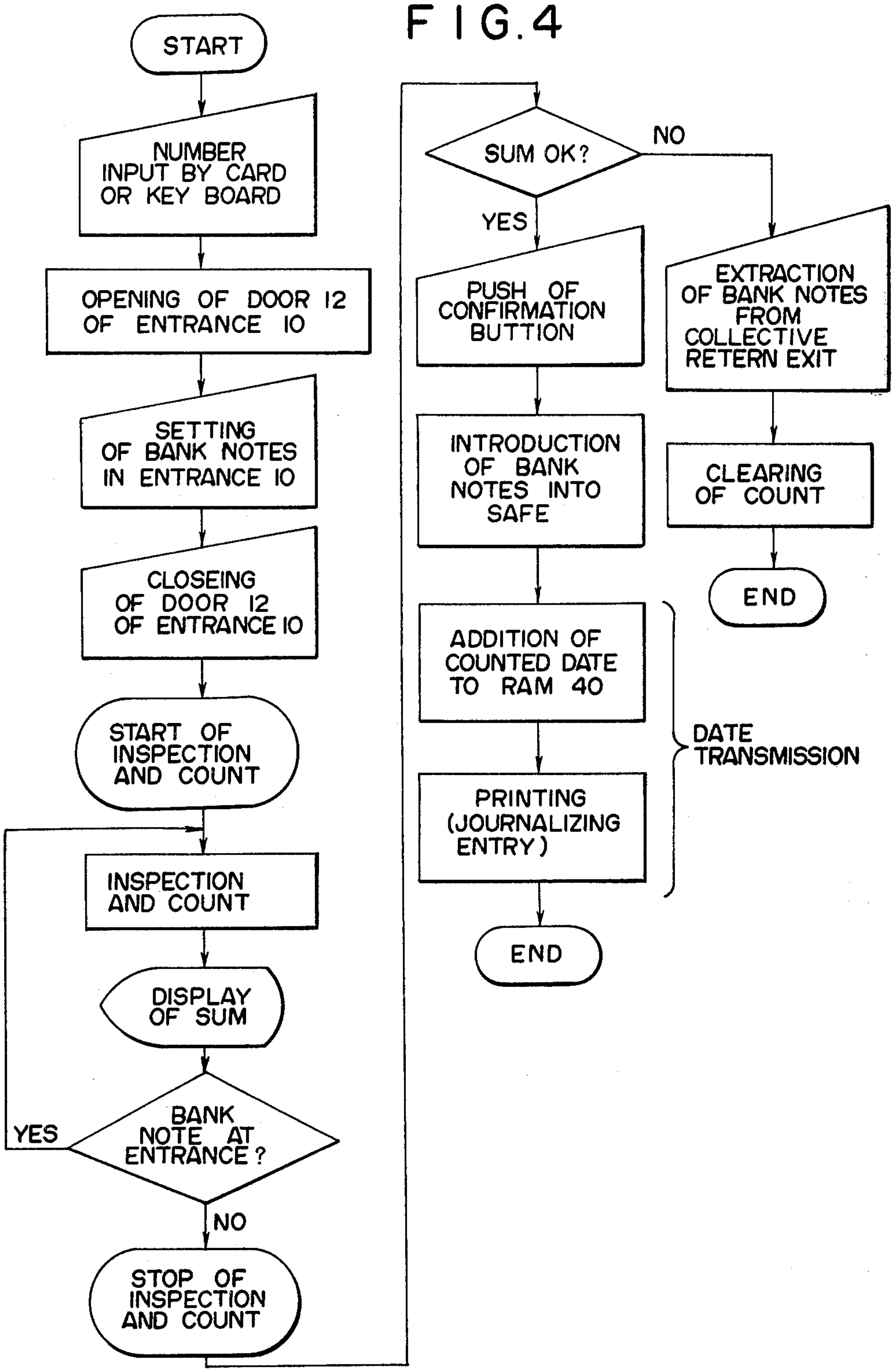
FIG. 4 is a flow chart explaining the operations of the bank note depositing apparatus.

The operations of the aforementioned embodiment will now be described with reference to the flow chart of FIG. 4. The operator prepares mixed kinds of about four hundred bank notes 13, for example, at hand and then inserts his own card into the card slit 6 of the operation table 2. At this time, the card reader 11 reads the number of the operator out of the inserted card and feeds its read signal to the control circuit 39 through the operation/display control circuit 43. Incidentally, in place of the insertion of the card, the operator may introduces his intrisic number by pushing the ten keys.

If the number introduced is found to be correct as a result of the aforementioned operation, the door 12 of the bank note entrance unit 10 is automatically opened. Then, the operator sets his prepared bank notes 13 in the bank note entrance unit 10 and closes the door 12. When this set state is detected by the bank note detecting switch 14, the inspecting and counting operations can be started.

Then, these inspecting and counting operations are started, and the bank notes 13 are transferred to the bank note conveyor system 17 one by one so that they are inspected in respect of their genuineness, kinds and overlap by the bank note inspecting unit 18. On the other hand, if one bank note 13 is inspected and found to be a genuine one, the summation is made and displayed in the display unit 8 each time in accordance with the kind discriminated. Moreover, the genuine bank notes 13 are stored in the temporary storage unit 24. Thus, when all the bank notes 13 in the bank note entrance unit 10 are transferred to the bank note conveyor system 17 so that they are inspected and counted, the bank note detecting switch 14 interrupts its bank note detecting operation whereby the bank note inspecting and counting operations are interrupted so that the final sound value is displayed in the display unit 8. At this time, the operator visually confirms the displayed sum and depresses the confirmation button 7 if the confirmed sum is coincident with the sum which has been calculated in advance, for example. At this time, the bottom plates 25 and 26 of the temporary storage unit 24 are opened so the about four hundred bank notes 13 are simultaneously allowed to drop into and stored in the storage portion 28A of the safe 28, for example. In this meanwhile, the final summed value, the counted number of the bank notes, the totaled sum and the totaled number, all of which are calculated by the arithmetic circuit 38, are written in a predetermined area of the RAM 40. Moreover, the final summed value and the number of the four hundred bank notes at this time, and the number of the operator, and the date are printed out by the printer 9.

Here, in case there is uncertainty in the sum, which is displayed in the display unit 8, after all the inspecting and counting operations of the bank notes 13 have been finished, the drawable plate 29 is drawn to extract the temporary storage unit 24 out of the body 1, and all the bank notes 13 are taken out. Then, the summed value and the number at this time are both cleared in an automatic manner. Thus, the aforementioned operations can be repeated again.

Incidentally, in the foregoing description, the mixed kinds of the bank notes are stored in the safe without any classification after their summed value and number have been calculated. Nevertheless, the bank notes may be classified in accordance with their kinds so that the summed values and numbers of the respective kinds may be either calculated or displayed and printed. Moreover, safes for different kinds of bank notes may be provided so that the bank notes may be stored in the different safes in accordance with their kinds. Still moreover, the number of the storage portions of the safe is naturally arbitrary. Still moreover, it is unnecessary to elaborately provide the door 12.

As has been described hereinbefore, according to the present invention, since there is provided the bank note depositing apparatus which is enabled to inspect and count the bank notes continuously and at a high speed and which is equipped with the movable safe having the plural storage portions, it is possible to provide an absolutely novel and highly efficient bank note depositing apparatus which has failed to be provided by the prior art.

What is claimed is:

1. A bank note depositing apparatus comprising: a bank note entrance unit; an inspecting unit for receiving the bank notes from said bank note entrance unit thereby to effect a variety of inspections including the kinds and genuineness of the bank notes; an arithmetic unit for counting the number and sum of the bank notes which have been inspected; a temporary storage unit for temporarily storing the genuine bank notes which have been subjected to the inspecting and arithmetic processings; and a movable safe including a plurality of storage portions for receiving and storing the bank notes, which are stored in said temporary storage unit after all of them have been processed, such that, when one of said storage portions is occupied by a predetermined number of the bank notes, another standby vacant storage portion is brought to a position where it can receive the bank notes from said temporary storage unit.

2. A bank note depositing apparatus according to claim 1, further comprising rejecting means for rejecting the bank note or notes which have been judged to be counterfeit, to have been conveyed in an overlapped manner, and to be impossible for the inspection.

3. A bank note depositing apparatus according to claim 1, further comprising: bank note detecting means for detecting the fact that the predetermined number of the bank notes are stored in the one of said storage portions; and safe moving means made responsive to the detecting operation of said bank note detecting means for moving said safe thereby to bring said another standby vacant storage portion to said position.

* * * * *